(12) United States Patent
Smith et al.

(10) Patent No.: US 9,079,507 B2
(45) Date of Patent: Jul. 14, 2015

(54) ELECTRIC DRIVING RANGE CALCULATOR

(75) Inventors: Irvin T. Smith, Rochester Hills, MI (US); Brian K. Bartnick, Ortonville, MI (US); Larry D. Laws, Macomb, MI (US); George K. Perekattu, Kottayam (IN)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 13/282,611

(22) Filed: Oct. 27, 2011

(65) Prior Publication Data

US 2012/0109413 A1     May 3, 2012

Related U.S. Application Data

(60) Provisional application No. 61/408,152, filed on Oct. 29, 2010.

(51) Int. Cl.
*G06F 7/00* (2006.01)
*B60L 11/18* (2006.01)
*B60W 40/10* (2012.01)

(52) U.S. Cl.
CPC ............ *B60L 11/1877* (2013.01); *B60W 40/10* (2013.01); *B60L 2200/26* (2013.01); *B60L 2240/12* (2013.01); *B60L 2250/16* (2013.01); *B60L 2260/52* (2013.01); *B60L 2260/54* (2013.01); *B60W 2510/244* (2013.01); *B60W 2510/305* (2013.01); *B60W 2550/402* (2013.01); *Y02T 10/7005* (2013.01); *Y02T 10/705* (2013.01)

(58) Field of Classification Search
CPC ............ G01C 21/3469; G01C 21/3676; G01C 21/3697; G01C 21/26; G01C 21/3617; G01C 21/34; G01C 21/3415; G01C 21/3484; G01C 21/3492; B60W 2540/04; B60W 2550/12; B60W 50/14; B60W 20/102; B60W 2520/10; B60W 2530/14; B60W 2540/12; B60W 2550/142; B60W 30/182; B60W 50/082; B60W 20/104; B60W 2510/0604
USPC ........ 701/1, 22, 31.4, 51, 123, 417, 533, 408; 320/132, 109, 150, 152
See application file for complete search history.

(56) References Cited

U.S. PATENT DOCUMENTS

| | | | |
|---|---|---|---|
| 6,826,460 B2 * | 11/2004 | Kittell et al. | 701/22 |
| 6,864,807 B2 | 3/2005 | Todoriki et al. | |
| 7,925,426 B2 * | 4/2011 | Koebler et al. | 701/123 |
| 8,346,419 B2 * | 1/2013 | Kelty et al. | 701/22 |
| 8,463,480 B2 * | 6/2013 | Kelty et al. | 701/22 |
| 8,463,481 B2 * | 6/2013 | Kelty et al. | 701/22 |
| 2002/0007348 A1 * | 1/2002 | Ali et al. | 705/51 |
| 2003/0006914 A1 * | 1/2003 | Todoriki et al. | 340/995 |
| 2006/0278449 A1 | 12/2006 | Torre-Bueno | |
| 2007/0112475 A1 * | 5/2007 | Koebler et al. | 701/1 |
| 2008/0021628 A1 * | 1/2008 | Tryon | 701/99 |
| 2008/0027639 A1 * | 1/2008 | Tryon | 701/209 |

(Continued)

*Primary Examiner* — John R Olszewski
*Assistant Examiner* — Truc M Do
(74) *Attorney, Agent, or Firm* — Dinsmore & Shohl LLP (57) ABSTRACT

A method of and device for determining driving range for a vehicle operating with a rechargeable energy storage supply. The method includes performing a calculation based on a limited number of input parameters, including a driving distance, average speed, location and time of day. Other determinations, such as the possibility of using a battery power-depleting climate control system, as well as battery capacity and climate data for various seasonal and location factors may also be used in the calculations.

15 Claims, 5 Drawing Sheets

(56) References Cited

U.S. PATENT DOCUMENTS

| | | | |
|---|---|---|---|
| 2008/0071472 A1* | 3/2008 | Yamada | 701/209 |
| 2008/0294339 A1* | 11/2008 | Tauchi et al. | 701/212 |
| 2009/0082957 A1* | 3/2009 | Agassi et al. | 701/208 |
| 2010/0049389 A1* | 2/2010 | Ando | 701/22 |
| 2010/0094496 A1* | 4/2010 | Hershkovitz et al. | 701/22 |
| 2010/0109856 A1 | 5/2010 | Kuenzner | |
| 2010/0138142 A1* | 6/2010 | Pease | 701/123 |
| 2010/0222952 A1* | 9/2010 | Yamaguchi | 701/22 |
| 2011/0153141 A1* | 6/2011 | Beechie et al. | 701/29 |
| 2011/0160993 A1* | 6/2011 | Tsurutani et al. | 701/200 |

* cited by examiner

ELECTRIC DRIVING RANGE CALCULATOR

This application claims the benefit of the filing date of U.S. Provisional Application No. 61/408,152, filed Oct. 29, 2010.

BACKGROUND OF THE INVENTION

This invention relates generally to a method and device to calculate the driving range for a vehicle, and more particularly to calculating the driving range for such a vehicle that is operating in an electric-only (i.e., charge-depleting) mode of a propulsion system that is relying at least in part on a battery-based power supply.

Hybrid and electric vehicles provide an alternative to conventional means of vehicular motive power by either supplementing (in the case of hybrids) or completely replacing (in the case of electric vehicles) a vehicle's traditional internal combustion engine (ICE). One form of such alternative vehicle is known as an extended range electric vehicle (EREV). In one embodiment of the EREV, primary electric drive is achieved with a battery or related rechargeable energy storage system (RESS) that acts as a direct current (DC) voltage source to a motor, generator or transmission that in turn can be used to provide the energy needed to rotate one or more of the vehicle's wheels. Once the electrical charge from the RESS has been depleted, backup power may come from an ICE to provide auxiliary onboard electrical energy generation. The Chevrolet Volt is an EREV that is being manufactured by the Assignee of the present invention.

Motive or related power to an EREV may be supplied by various battery architectures including nickel-metal hydride batteries, lead acid batteries, lithium polymer batteries and lithium-ion batteries. Of these, the lithium-ion battery appears to be particularly promising for RESS vehicular applications. Irrespective of the battery form, it would be inconvenient for a vehicular operator to correlate driving distance with available battery charge. Methods to perform this correlation are available, but they require detailed information about (among other things) a particular operator's driving behavior and geographic location, thereby making such a system impractical. For example, modeling simulation tools allow for output of vehicle energy-related metrics (including acceleration, fuel economy, driving distance or the like), but involve complex methodologies that require extensive training of engineers, researchers, computer programmers or related highly-skilled personnel in order to use such models successfully. Moreover, such models require large amounts of input data in order to be run correctly. Examples of such input data includes typical drive cycle (such as city, highway, aggressive or the like), hilliness (such as flat road, varying degrees of hill grades or the like), ambient and battery temperatures, tire pressures and type, cargo or passenger weights and multiple vehicle set-ups (battery size, engine size, transmission type/calibration, aerodynamics, accessory electric loads, air conditioning/heating settings or the like). Furthermore, such models also require high-powered computers to run the complex software.

SUMMARY OF THE INVENTION

Embodiments of the present invention can be used to calculate driving range of an EREV or other RESS-based vehicular propulsion system without the need to resort to complex models such as those discussed above. More particularly, the calculation may be based on simple inputs of driving parameters, such as trip distance, a typical time to complete such trip and particular geographic location, climate or the like. Features of the present invention could be made into an application that could be easily integrated with a smart phone, global positioning system (GPS) device or directly integrated into the vehicle's driver information center or related onboard computer-based device. One objective of the present invention is to be able to provide an electric driving distance output that is accurate to within about 1.5 miles.

In one form of the invention, an empirical methodology can be used to analyze simple input factors that impact driving distance as a simple and robust method for estimating the driving range for EREVs, as well as other electric power-based vehicles. In a particular form, the empirical methodology can be a Design For Six Sigma methodology that applies an analysis of variance (ANOVA) approach to provide a statistical test of data from computer models and physical tests; in a typical form, ANOVA uses multiple classes of models. From this, predictive algorithms are generated and refined as a way to reduce the number of inputs necessary to make the prediction. Such reliance upon fewer inputs (also known as a reduced set of input parameters or reduced user-input instruction set) can promote user interface simplification. Further, a prediction algorithm using such a methodology is simple to generate, and requires minimal computing resources to run, as many variables that would have been included in a physics-based model would not be needed in this simplified model. The present inventors used empirical methods to develop a model that allows for calculation of electric driving range for an EREV based on trip distance and time (used to calculate average speed) and geographic location (for exterior temperature and heating, ventilation and air conditioning (HVAC) requirements). This model was used to develop a graphical user interface (GUI) that could be used by vehicle manufacturers, dealers and customers as a way to determine how driving habits and location affect the electric-only (i.e., charge-depleting) range associated with RESS operation. In one form, the GUI can be a flash memory-based calculator. In addition, the GUI could be incorporated into a web site for ease of retrieval and use. Easy-to-use features allows even untrained operators to calculate the electric range they will likely obtain by merely inputting where they live and their drive distance and time. As such, there is no need for sophisticated energy modeling.

According to a first aspect, a method for determining a driving range of an electric-powered vehicle includes receiving from a user numerous driving parameters into a driving range calculator. As stated above, a reduced set of input parameters greatly simplifies both the user's task and cognitive workload, as well as the complexity of the calculations performed by the driving range calculator. Such reduced input set includes segment distance, average speed, location and time of day. Upon receipt of such input, the value of one or more process parameters is calculated; such process parameters are understood to be those intermediate values used by a driving range calculator, and include energy required to travel based upon the segment distance and average speed, driving time required to go a specified portion of the segment distance, and energy required to go the specified portion. The method further includes determining if the segment distance can be completed based on the calculated process parameter values, as well as outputting the driving range in a sensory-compatible format.

Optionally, the method includes receiving one or more of battery capacity and climate data; this data is used as input to adjust the calculated values of the respective calculated distance needed without the climate control/HVAC system and the calculated energy used by the climate control/HVAC system over the incremental specified portion of the segment/ distance/trip distance. In a more particular form, this means that the energy required to travel based upon the segment distance and average speed comprises an energy required when a climate control system is not being substantially used. Likewise, the energy required to go the specified portion corresponds to that energy used by a climate control/HVAC system over the specified portion of the segment distance. It will be appreciated that this other information used by the driving range calculator, such as the battery capacity and the climate or seasonal data, is not considered to be destructive of the reduced set of input parameters discussed above, as such information is either provided by sensors configured to read such parameters, or through a conventional stored data means, such as a lookup table or related device. Accordingly, this other information does not add to the driver or other user's information input load. As mentioned below, some of this other information can be sensed directly and then automatically fed into the instructions or related algorithm of the present invention as a way to further simplify the user's input needs. Likewise, in configurations where the device is cooperative with suitable temperature or position indicating equipment (the latter for example as GPS-based device) information pertaining to temperatures and locations could be acquired automatically, thereby simplifying (or eliminating) the need for at least the location input from the group of input parameters discussed above. The method may further comprise iteratively determining if the segment distance can be completed based on the calculated values. In this way, calculations relating to the specified portion can be parametrically changed (for example, increasing the specified portion distance by one mile per iteration) to see what impact this will have on the subsequent determination of whether the next incremental mile can be completed given the remaining power or charge left in the battery pack. In one particular for, the input is received from the user through a GUI. Likewise, sensory-compatible format may be delivered through a smart phone, a GPS device, personal digital assistant or driver information center.

According to another aspect of the present invention, a device for calculating driving range of an electric-powered vehicle is disclosed. The device includes a GUI, a computer with one or more processors and a non-transitory memory such that instructions stored in the memory are executed by the processor or processors. The GUI can receive user inputs, as well as display output to the user. The instructions operate on the input that corresponds to numerous driving parameters such as segment distance, average speed, location and time of day. In addition, the instructions include algorithms that can be used to calculate various parameters that can be used to provide indicia of the calculated driving range to the user. Such indicia may include remaining battery power (or related energy indicia), remaining trip distance or the like.

Optionally, the indicia of the calculated driving range comprises at least one of an estimated remaining range of the segment distance and an estimate of whether the segment distance can be completed based on remaining energy available from a battery power source. Such user information is preferably conveyed in a sensory-compatible format to the user through an output, such as the GUI. The instructions may be more particularly configured to determine a value of at least one of (a) energy required to travel based upon the segment distance and average speed, (b) driving time required to go a specified portion of the segment distance and (c) energy required to go the specified portion. In this way, these determined values are subsequently used to determine if the segment distance can be completed based on remaining energy available from a battery power source.

In additional options, the entry of inputs and the calculation of driving range are made into a computer application; such an application may be integrated with a smart phone, GPS device, personal digital assistant or directly integrated into a vehicle driver information center or related computer-based device. Thus, in one particular form, the instructions needed to carry out the various driving range estimation steps could be embodied as an application for a GPS device, or other portable communication device. For example, when embodied to cooperate with (or be part of) a GPS system, the system will know where the device is located (i.e., its geographic location), as well as the time of day; in such a circumstance, information such as current temperature could be looked up and loaded into the instructions. Likewise, if the device is located within a car or related vehicle with an enclosed space, it could tie in to a vehicular outside air thermometer and use that as the current temperature in any of its calculations. Memory storage can be used to hold other information that may be used to make the calculation, but that isn't needed as input from the user. Such other information may be in the form of battery capacity (such as the aforementioned kilowatt-hours) and climate data for each season for a particular location of interest; this information can be used to adjust the energy required to travel (for example, over the segment distance or a portion thereof) based upon the use of the climate control/HVAC system, as well as its comparison to when no such climate control system is present or the climate control system is not being used. The energy required to go the specified portion is preferably that which corresponds to that energy used by the climate control system over the specified portion of the segment distance. The instructions may preferably be used to determine incremental increases in the specified portion of the segment distance, as well as how much energy is used in traversing the distance corresponding to the specified portion of the segment distance. At least a portion of the instructions are based on a DFSS methodology.

BRIEF DESCRIPTION OF THE DRAWINGS

The following detailed description of specific embodiments can be best understood when read in conjunction with the following drawings, where like structure is indicated with like reference numerals and in which.

The embodiments set forth in the figures are illustrative in nature and are not intended to be limiting of the embodiments defined by the claims. Moreover, individual aspects of the figures and the embodiments will be more fully apparent and understood in view of the detailed description that follows.

DETAILED DESCRIPTION OF THE PREFERRED EMBODIMENTS

Figure 1:
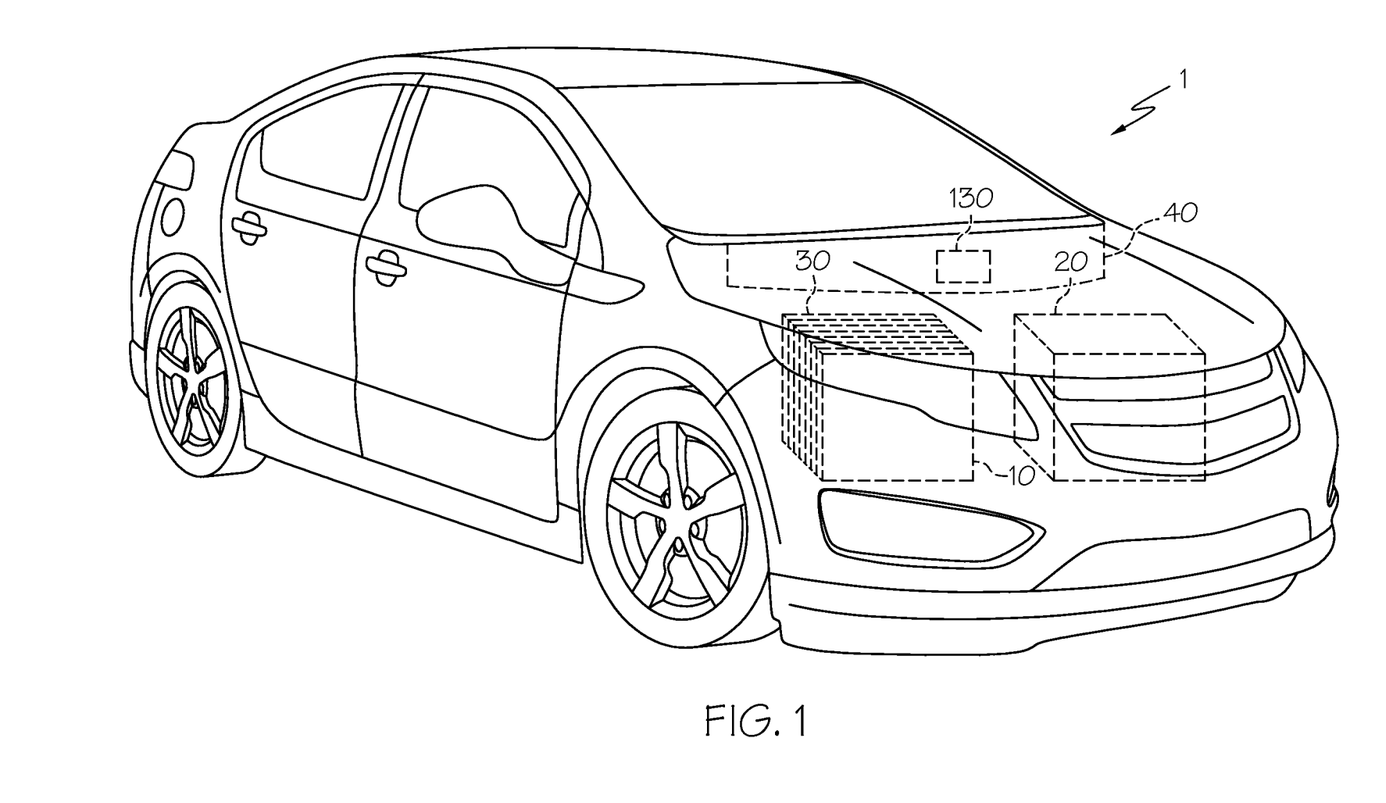
FIG. 1 is a representation of a vehicle which includes a hybrid propulsion system including a RESS or related battery pack and a conventional internal combustion engine (ICE)

Referring first to FIG. 1, a vehicle 1 includes a hybrid propulsion system in the form of a battery pack 10 and a conventional ICE 20. As mentioned above, such a vehicle is known as an EREV. Battery pack 10 employs numerous battery modules 30 that are typically arranged in a repeating array as shown. In one typical example, battery pack 10 may about two hundred individual battery cells, although it will be appreciated by those skilled in the art that additional or fewer cells may be needed, depending on the power required. It will be further appreciated by those skilled in the art that vehicle 1 may not require an ICE 20; in such case, rather than being an EREV, it is an EV; either form is equally compatible with the present invention. The vehicle 1 is shown as having a dashboard 40 with a display screen (or more simply, display) 130 as a way to provide informational output, as will be discussed in more detail below.

Figure 2:
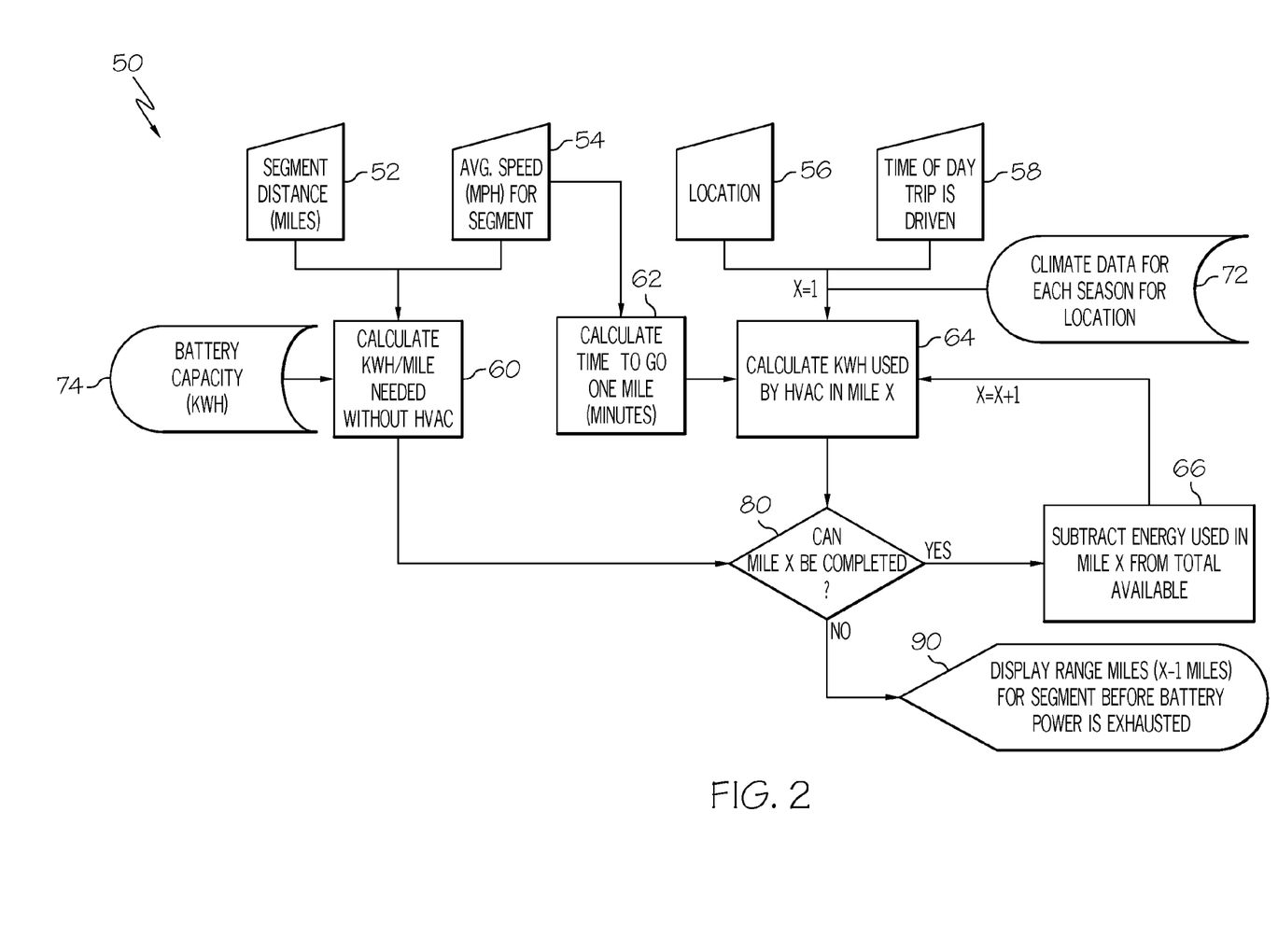
FIG. 2 shows an EREV range prediction flowchart according to an aspect of the present invention.

Referring next to FIG. 2, steps in using the empirical methodology 50 of the present invention are shown. Importantly, the number of user inputs needed to estimate driving range is very small; in particular, only four are needed, including the segment (or driving or trip) distance 52, average speed 54 for the segment, location 56 (for example, the geographic location for various cities) and time of day 58 that the trip is to be taken. In one form, the average speed 54 provides indicia of driver behavior. As mentioned above, in one preferred form, the user is a driver or passenger of vehicle 1. From the first two inputs distance 52 and average speed 54, the amount of energy needed to travel the requisite distance 60 is calculated. Although the calculated requisite distance 60 is shown as kilowatt-hours per mile, it will be appreciated that any comparable units may be employed. Likewise, from the average speed 54, the time 62 (for example, in minutes) it takes for the vehicle 1 to travel one unit of distance (for example, one mile as shown) is calculated. As with calculated requisite distance 60, it will be appreciated that any comparable units of distance may be employed. The calculated time 62, in conjunction with the location 56 and time of day 58 inputs may be used to calculate the amount of energy 64 (for example, in kilowatt-hours) used by a climate control system (not shown) over a specified portion X of the segment. In one preferred form, the climate control system includes at least a heating component and an air-conditioning component, both of which may place significant loads on the battery pack 20. Stored data, such as climate data 72 for each season and for each location 56, is fed into the respective calculations 60 and 64. It will be appreciated that the use of the term "energy" is considered interchangeable with power or other rate of use of such energy unless the context dictates otherwise.

Output from the calculation 64 of the amount of energy used by the climate control system may then be used in decision point 80, where such output is added to the energy required to propel the vehicle one mile 60 to determine if the specified portion X can be completed. If the output from decision point 80 satisfies the criteria, the energy from the calculation 64 for portion X is subtracted from the total available in the form of a calculated remaining energy 66, after which the calculation 64 for the next specified portion X+1 is made. The calculation 64 of the amount of energy used by the climate control system can be done iteratively, such that after a calculation is made for specified portion X and then X+1, it can be repeated for the remaining updated portions X+2, X+3 and so forth. If the output from decision point 80 does not satisfy the criteria, an output is displayed to the user indicating a range 90 corresponding to previous portion X−1 is all that is available until the power from battery pack 20 is exhausted. As discussed above, such output may be made in the form of visual output to display screen 130 shown in FIGS. 1 and 3.

Figure 3:
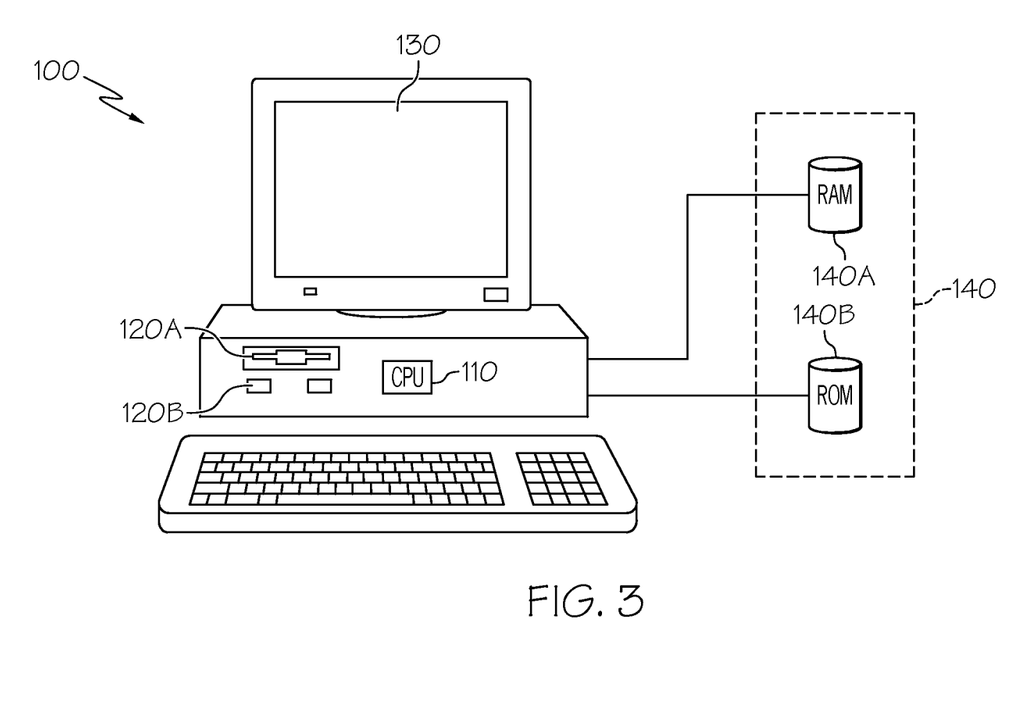
FIG. 3 shows a generalized computer-based controller that can be used to perform the calculations of the flowchart of FIG. 2.

Referring next to FIG. 3 in conjunction with FIG. 2, to perform one or more of the steps (including calculations) of FIG. 2 that are used to determine the driving range expected for vehicle 1, the formula or related algorithm may be embodied in a calculating device such as a computer 100 or related data processing equipment. As shown with particularity in FIG. 2 and discussed above, in addition to the four user inputs of segment distance 52, average speed 54 for the segment, location 56 and time of day 58, the battery capacity 74 and climate data 72 are understood to be stored data, while calculated requisite distance 60, calculated time 62, calculated energy 64 and calculated remaining energy 66 are understood to be process steps, decision point 80 is understood to be a decision and the display of the range distance 90 is understood to be an output display. The computer 100 (regardless of whether configured as an autonomous device (such as a smart phone or related personal digital assistant (PDA)), workstation, mainframe or other form) preferably includes a central processing unit (CPU) 110 (which may be in the form of one or more microprocessors), an optical disk loader 120A or USB port 120B), display 130, a memory 140 and computer-readable program code means (not shown) to process at least a portion of the received information relating to the driving range. As will be appreciated by those skilled in the art, memory 140 may be in the form of random-access memory (RAM) 140A (also called mass memory, which can be used for the temporary storage of data) and instruction-storing memory in the form of read-only memory (ROM) 140B. In addition to other forms of input not shown (such as through an internet or related connection to an outside source of data), the optical disk loader 120A or USB port 120B may serve as a way to load data or program instructions from one computer-usable medium (such as CD-ROM, flash drives or the like) to another (such as memory 140). Either or both of memory 140 and external devices (such as those configured to exchange information with computer 100 through the optical disk loader 120A, USB port 120B or other similar device) may be used to house the stored data 72 and 74 from FIG. 2.

As will be appreciated by those skilled in the art, computer 100 may exist as an autonomous (i.e., stand-alone) unit, or may be the part of a larger network, such as those encountered in cloud computing, where various computation, software, data access and storage services may reside in disparate physical locations. Such a dissociation of the computational resources does not detract from such a system being categorized as a computer. Thus, although shown notionally in the figure as a stand-alone desktop machine, it will be appreciated by those skilled in the art that computer 100 may exist in numerous other structural forms, depending on the need for integration into the particular environment of vehicle 1; such other forms may include dissociated placement of the various components in a manner deemed most compatible with the needs of the vehicle's manufacturer or operator.

In one particular form, computer 100 may be configured as a controller such that it can sense one or more parameters of the system being controlled, and then facilitate changes in system operation based on some deviation as indicated by the sensed signal. Such a computer 100 may include one or more modules, as needed, to perform the functionality indicated, where a module may refer to an application specific integrated circuit (ASIC) or the like to cooperate with the aforementioned processor and memory, as well as one or more software or firmware programs, combinational logic circuit or other suitable components. Program modules that include routines, programs, objects, components, data structures, and/or other elements that perform particular tasks or implement particular abstract data types can be loaded into or otherwise cooperative with the controller 100. In a form specific to the present invention, the computer 100 may be configured to contain predetermined data (for example, that which correlates measured or sensed temperature values, or a formula or algorithm configured to perform a certain calculation); this information may be stored in memory in the form of a formula or lookup table, where the latter is a static array or related data structure of often-used data that can be retrieved in a way that is faster than through a runtime computation.

Figure 4:
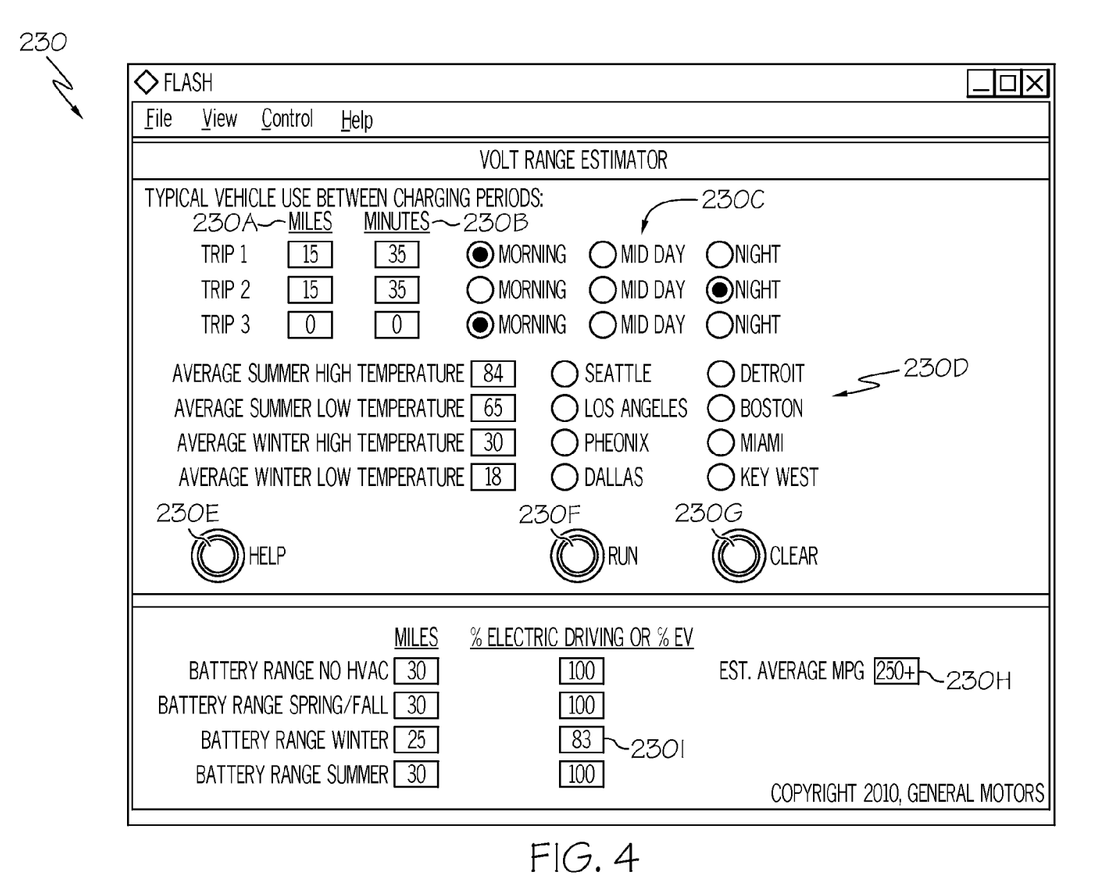
FIG. 4 is a schematic showing a representative screen with both input parameters and output ranges according to an aspect of the present invention.
Figure 5:
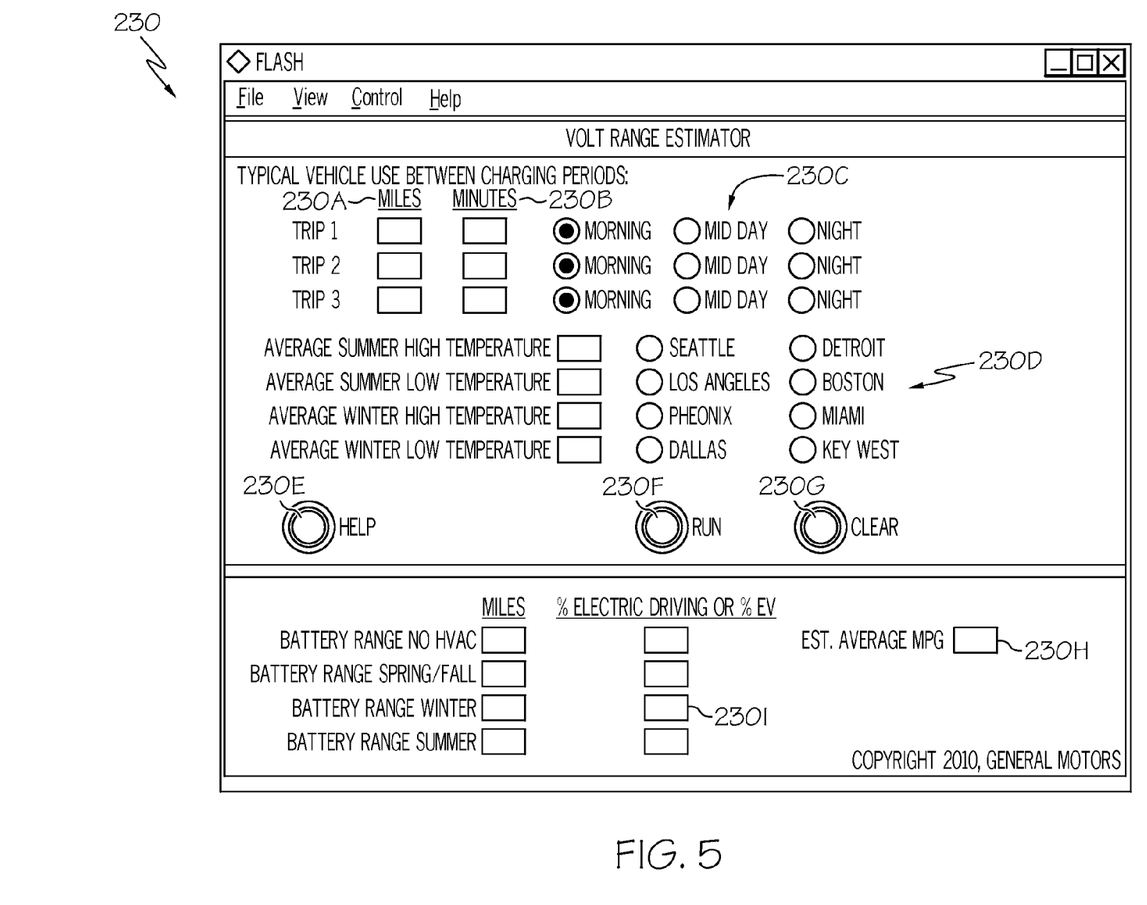
FIG. 5 is the representative screen of FIG. 3 with the various input and output fields left blank and prior to operator or user input.

Referring to FIG. 4 and FIG. 5 in conjunction with FIGS. 1 and 3, one example of the dissociated placement discussed above involves display 130, which may be used for visual output to the driver, as well as (in configurations where the display 130 is used as a touch screen) for allowing entry of driving parameters or related inputs by the driver. As mentioned above, display 130 may be placed in the vehicle's passenger compartment in general, and in particular on dashboard 40 in order to provide readily-apparent visual indicia to the driver. Furthermore, display 130 may include input functions in addition to its visual output; in such circumstance, display 130 of FIGS. 1 and 3 may be configured as a GUI 230 of FIGS. 4 and 5 such that the driver can easily input driving range requests or other informational requests. As will be understood, in situations where display 130 of FIGS. 1 and 3 involve interactive features such as shown in FIG. 4, the output functions of display 130 will be considered similar to that of GUI 230 the latter of which also includes various input fields 230A through 230I with which to enter driving parameters. These parameters include trip distance 230A (shown in miles), trip time 230B (shown in minutes), general portion of the day 230C (for example, morning, mid-day or night) and geographic location 230D (showing cities representative of various geographic locations within the continental United States, for example). In one embodiment, certain values may be included in preset form, whiles others may be preset with the option of being user-modified. Likewise, such values can be specific to the vehicle's market (for example, the US), or can be adjusted for global use; either version is within the scope of the present invention. Various control buttons, such as a help button 230E, run button 230F and a clear button 230G, may also be included. It will be apparent from the context whether discussion of displayed output is through the more generalized display 130 or the more particular GUI 230; otherwise, reference to output to a display will be considered within the present disclosure to be applicable to either configuration.

The lower portion of GUI 230 shows forms of output related to the calculated driving range 230I as well as the calculated estimated average miles per gallon (MPG) 230H. As indicated above, GUI 230 is preferably located in a place convenient for a driver or other user, such as dashboard 40 as shown in FIG. 1; however, in situations where the user is not a driver (instead, for example, a designer, salesperson or the like) GUI 230 could also be displayed on a designer's desktop, a car salesman's computer screen, or on a smart phone or any personal digital device, as discussed above. FIG. 5 shows the GUI 230 of FIG. 4 cleared of driving parameters and calculated data.

Additional operation (not shown) may also be included; such may permit for reading measured coolant temperature, RESS current, RESS pack resistance and coolant mass flow rate. From this information, a calculated thermal power may be determined. This power value is that which is required to drive the RESS temperature to the desired target value. Once calculated, this thermal power is then added to the RESS heat generation power. This adjusts the power demand to the high voltage devices to ensure the RESS is conditioned appropriately. Similar operation can be performed for a RESS heating operation. As stated above, the algorithm may be in the form of an application that may be loaded into a personal digital device, such as a smart phone, personal digital assistant (PDA) or the like.

It will be appreciated by those skilled in the art that empirical methods in general and DFSS in particular is a process for efficiently and quickly developing robust products that efficiently deliver the needs of the customer. Further, such methods may be employed to maximize or improve a process that either has become obsolete or previously did not exist. DFSS may employ numerous related tools such as operations research, Taguchi methods, Design of Experiments (DOE), the aforementioned ANOVA, Total Quality Management (TQM) or the like. In particular, DFSS could be used in the following way. First, the present inventors use DOE to come up with numerous Unified Modeling Language (UML) runs of various combinations of temperature, hilliness, aggressiveness of driving, vehicle mass and tire pressure. The output of the UML predicted EREV ranges for all of these runs. From these range predictions, the inventors then used ANOVA to evaluate significant factors while disregarding the hilliness, vehicle mass and tire pressure factors. From this, the inventors developed a simple curve fit function that accurately calculates EREV range by using only the segment distance, average speed, geographic location and time of day for the trip, where the geographic location and time of day taken together provide the temperature. Lastly, the inventors confirmed this curve fit function through some "real-world" driving of an EREV at various speeds, distances and time as part of a validation activity.

As such, DFSS may be considered a process where each step may be subjected to a variety of tools such as those mentioned above. Preferably, this allows efficient identification of important relationships, such as those used to determine incremental increases in a specified portion of the segment distance, as well as how much energy is used in traversing the distance corresponding to such specified portion. As such, DFSS may be one method for helping to achieve the novel identification between such relationships.

While certain representative embodiments and details have been shown for purposes of illustrating the invention, it will be apparent to those skilled in the art that various changes may be made without departing from the scope of the invention, which is defined in the appended claims.

What is claimed is:

1. A method for determining a driving range of an electric-powered vehicle, the method comprising:

receiving, via a user input, segment distance, average speed into a driving range calculator;

receiving location and time of day from position indicating equipment;

calculating a value of at least one of an energy required to travel based upon the segment distance and average speed, driving time required to go a specified portion of the segment distance and energy required to go the specified portion, wherein the energy required to go the specified portion corresponds to that energy used by a climate control system over the specified portion of the segment distance;

retrieving climate data relating to each season for the location from stored data;

calculating an amount of energy used by a climate control system over the segment distance using the time of day, location, and the climate data;

determining whether the segment distance can be completed based on the calculated values and calculated energy used by the climate control system; and outputting the driving range in a sensory-compatible format.

2. The method of claim 1, further comprising receiving at least one of battery capacity such that a determination of at least one of the calculated values takes into consideration calculation input created thereby.

3. The method of claim 1, wherein the energy required to travel based upon the segment distance and average speed comprises an energy required when a climate control system is not being used.

4. The method of claim 1, further comprising iteratively determining whether the segment distance can be completed based on the calculated values based on incremental increases in the specified portion of the segment distance.

5. The method of claim 1, wherein the receiving is through a graphical user interface.

6. The method of claim 1, wherein the sensory-compatible format comprises a smart phone, a GPS device, personal digital assistant or driver information center.

7. The method of claim 1, wherein an empirical methodology comprises a DFSS methodology.

8. A device for calculating driving range of an electric-powered vehicle, the device comprising:
a display;
a graphical user interface displayed on the display and configured to receive user inputs that correspond to segment distance, average speed, location and time of day;
a computer coupled to the display and comprising at least one processor and a non-transitory memory such that instructions stored in the memory are executed by the at least one processor, the at least one processor configured to:
calculate a value of at least one of an energy required to travel based upon the segment distance and average speed, driving time required to go a specified portion of the segment distance and energy required to go the specified portion,
retrieve climate data relating to each season for the location from stored data in the memory,
calculate an amount of energy used by a climate control system over the segment distance using the time of day, location, and the climate data, and
determine whether the segment distance can be completed based on the calculated values and calculated energy used by the climate control system;
memory storage for receiving at least one of battery capacity that can be used to adjust the energy required to travel based upon the segment distance and average speed and the energy required to go the specified portion, wherein the energy required to go the specified portion corresponds to that energy used by a climate control system over the specified portion of the segment distance; and
an output configured to convey indicia of the calculated driving range to a user through the graphical user interface.

9. The device of claim 8, wherein the indicia of the calculated driving range comprises at least one of an estimated remaining range of the segment distance and an estimate of whether the segment distance can be completed based on remaining energy available from a battery power source.

10. The device of claim 9, wherein the instructions are configured to determine a value of at least one of (a) energy required to travel based upon the segment distance and average speed, (b) driving time required to go a specified portion of the segment distance and (c) energy required to go the specified portion such that the determined values are subsequently used to determine whether the segment distance can be completed based on remaining energy available from a battery power source.

11. The device of claim 8, wherein the instructions are cooperative with at least one of a smart phone, a GPS device, personal digital assistant and vehicle driver information center.

12. The device of claim 8, wherein the energy required to travel based upon the segment distance and average speed comprises an energy required when a climate control system is not being used.

13. The device of claim 8, wherein the instructions are used to determine incremental increases in the specified portion of the segment distance, as well as how much energy is used in traversing the distance corresponding to the specified portion of the segment distance.

14. The device of claim 8, wherein at least a portion of the instructions are based on a DFSS methodology.

15. The device of claim 8, wherein the output is displayed on the graphical user interface.

* * * * *